United States Patent
Park et al.

(10) Patent No.: US 11,243,339 B2
(45) Date of Patent: *Feb. 8, 2022

(54) OPTICAL FILTER CELL ARRAY STRUCTURE WITH RESIN AND TEMPERED GLASS AND METHOD OF MANUFACTURING THE SAME

(71) Applicant: UTI Inc., Chungcheongnam-do (KR)

(72) Inventors: Deok Young Park, Gyeonggi-do (KR);
Jae Young Hwang, Gyeonggi-do (KR);
Hak Chul Kim, Chungcheongnam-do (KR);
Hyunho Kim, Seoul (KR);
Tea Joo Ha, Chungcheongnam-do (KR);
JongHwa Lee, Gyeonggi-do (KR)

(73) Assignee: UTI INC.

( * ) Notice: Subject to any disclaimer, the term of this patent is extended or adjusted under 35 U.S.C. 154(b) by 558 days.

This patent is subject to a terminal disclaimer.

(21) Appl. No.: 16/209,509

(22) Filed: Dec. 4, 2018

(65) Prior Publication Data

US 2019/0179066 A1    Jun. 13, 2019

(30) Foreign Application Priority Data

Dec. 11, 2017    (KR) .................. 10-2017-0169568

(51) Int. Cl.
*C03C 3/04* (2006.01)
*C03C 17/32* (2006.01)
(Continued)

(52) U.S. Cl.
CPC ............... *G02B 5/208* (2013.01); *C03C 3/04* (2013.01); *C03C 17/32* (2013.01); *C03C 17/42* (2013.01);
(Continued)

(58) Field of Classification Search
CPC . C03B 33/0222; C03C 17/032; C03C 17/322; C03C 17/326; C03C 17/34;
(Continued)

(56) References Cited

U.S. PATENT DOCUMENTS

2007/0126974 A1* 6/2007 Lai .................... G02F 1/133382
    349/161
2013/0044384 A1* 2/2013 Kim ........................ G02B 5/20
    359/885

(Continued)

FOREIGN PATENT DOCUMENTS

KR    1020150067154 A    6/2015
KR       101570658 B1    11/2015
KR    1020160088147 A    7/2016

*Primary Examiner* — Ryan S Dunning
(74) *Attorney, Agent, or Firm* — Mendelsohn Dunleavy, P.C.

(57) ABSTRACT

Disclosed is an optical-filter-cell-array structure and a method of manufacturing the same. An optical filter which includes an optical filter layer for blocking light of a specific wavelength formed on an upper side or a lower side of a tempered glass substrate is provided in the form of a cell array. The method includes forming a sheet-cutting part according to the form of a cell array on a mother glass substrate, tempering the mother glass substrate so that a lateral side of the mother glass substrate is tempered through the sheet-cutting part while an upper side and a lower side of the mother glass substrate are tempered, and forming an optical filter layer on the upper side or the lower side of the mother glass substrate.

18 Claims, 4 Drawing Sheets

(51) Int. Cl.
    *C03C 21/00*     (2006.01)
    *G02B 1/14*     (2015.01)
    *G02B 5/20*     (2006.01)
    *G02B 5/26*     (2006.01)
    *C03C 17/42*     (2006.01)
    *G02B 5/22*     (2006.01)

(52) U.S. Cl.
    CPC .............. *C03C 21/002* (2013.01); *G02B 1/14* (2015.01); *G02B 5/26* (2013.01); *C03C 2217/445* (2013.01); *C03C 2217/485* (2013.01); *C03C 2217/70* (2013.01); *G02B 5/201* (2013.01); *G02B 5/223* (2013.01); *G02B 5/226* (2013.01)

(58) Field of Classification Search
    CPC . C03C 17/42; C03C 21/002; C03C 2217/445; C03C 2217/485; C03C 2217/70; G02B 1/14; G02B 5/201; G02B 5/208; G02B 5/223; G02B 5/226; G02B 5/26
    See application file for complete search history.

(56) References Cited

U.S. PATENT DOCUMENTS

| | | | | |
|---|---|---|---|---|
| 2013/0141777 A1* | 6/2013 | Fujishiro | ................ | G02F 1/167 359/296 |
| 2015/0316843 A1* | 11/2015 | Xu | ..................... | G03F 7/0035 359/885 |
| 2017/0183257 A1* | 6/2017 | Apitz | ..................... | C03C 3/097 |

* cited by examiner

FIG. 2
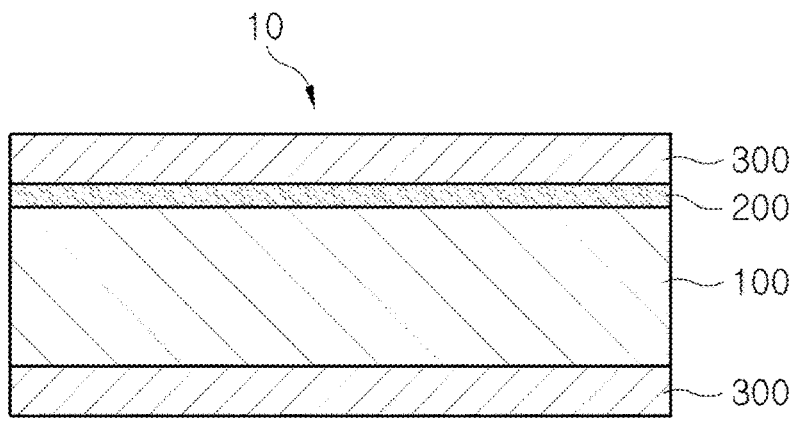
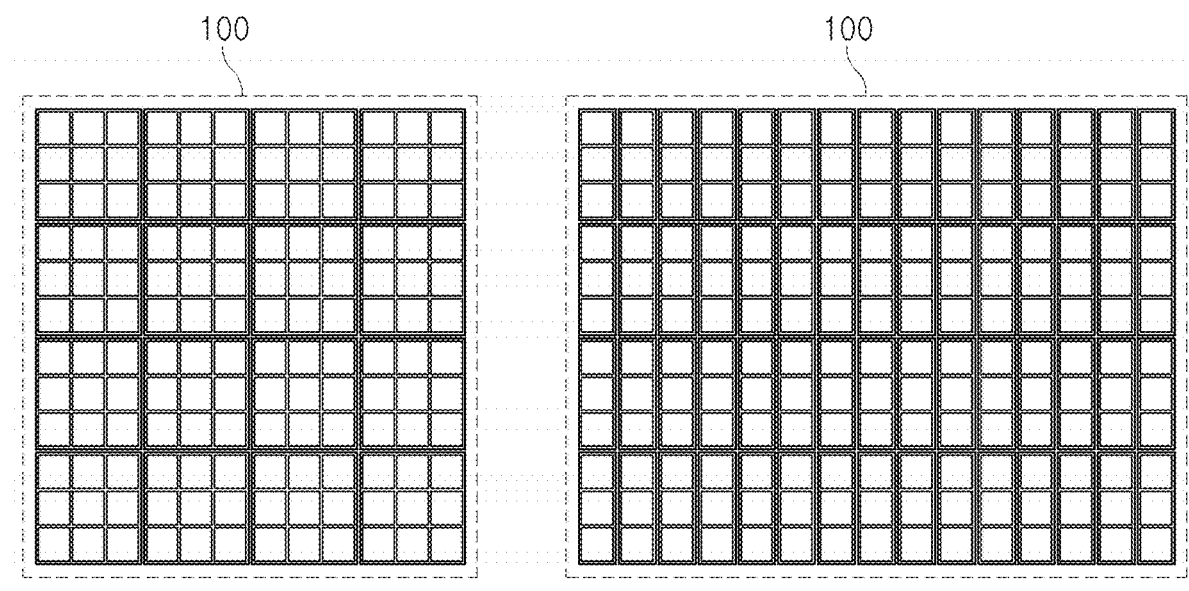
FIG. 3A FIG. 3B

OPTICAL FILTER CELL ARRAY STRUCTURE WITH RESIN AND TEMPERED GLASS AND METHOD OF MANUFACTURING THE SAME

BACKGROUND OF THE INVENTION

1. Field of the Invention

The present invention relates to an optical-filter-cell-array structure and a method of manufacturing the same, and more particularly to an optical-filter-cell-array structure which has reinforced strength by providing an optical filter using a tempered glass substrate, and a method of manufacturing the same.

2. Description of the Related Art

An optical filter is an apparatus for selectively transmitting a band of a specific wavelength or preventing transmission thereof, and is provided by forming an optically designed multi-layered film on a substrate.

Optical filters are used in various fields, and in particular are widely used to control the wavelength of light received by an image pickup lens of a camera.

Generally, solid-state image pickup devices such as CCD or CMOS, which convert light into electric signals, are used in video cameras, digital cameras, or cameras of smart phones. The solid-state image pickup devices receive light not only in a visible-ray region (400 to 700 nm) but also in a near-infrared region (1200 nm or less), so that there is a difference in color between the image actually recognized by people and the screen image.

In order to correct this, an optical filter such as a near-infrared-cut filter for blocking the wavelength in the near-infrared region is used.

The near-infrared-cut filter is positioned between the image pickup lens and the solid-state image pickup device constituting an image pickup apparatus, and serves to provide light to the light-receiving part of the solid-state image pickup device so that the portion of the light, incident from the image pickup lens, in the near-infrared region is blocked.

As a conventional near-infrared-cut filter, a reflection-type cut filter including a near-infrared reflection layer formed on the upper side or the lower side of a transparent glass substrate has been used. However, recently, a hybrid filter having an absorption type and a reflection type combined therein has been widely used in accordance with the development of a high-pixel model.

For example, there is technology for forming a near-infrared reflection layer including an oxide multi-layered film on a blue glass substrate that absorbs near-infrared rays.

This glass substrate may be broken by external impact or stress. In the case of a commercially available near-infrared-cut filter, the glass substrate is thick, and it is very difficult to handle and process the glass substrate if the glass substrate is thin.

In recent years, a technique has been used in which a resin substrate containing a pigment absorbing near-infrared rays has come to be used, and a near-infrared reflection layer including an oxide multi-layered film is formed on the upper side and the lower side thereof.

However, when the resin substrate is used, there are problems in that the cost is higher than that of a glass substrate, bending due to external stress occurs, or the coating yield of the oxide multi-layered film is low.

Further, in the case of the conventional glass substrate (generally using borosilicate glass) or resin substrate, stress is generated due to the difference in thermal expansion coefficient between a deposition material and a substrate during deposition of a near-infrared-absorption layer or a reflection layer, causing warpage of the substrate. Accordingly, it is difficult to realize deposition conditions due to the warpage of the conventional substrate.

Therefore, there is a need for a new near-infrared-cut filter structure.

Meanwhile, in the case of smart phones, which have come to be used more widely than video cameras or digital cameras, there is increasing demand for differentiated design, along with the demand for high image quality and high performance, and accordingly, slimmer and lighter products are required.

However, an increase in the resolution of cameras requires a lens system using at least three or more image pickup lenses, and there is the requirement of specification for realizing high resolution, in which a near-infrared-cut filter and a solid-state image pickup device are used as basic constituents. Accordingly, there is a limit in the extent to which the thickness of the image pickup apparatus can be reduced, which limits the slimming of the smart phone.

In order to reduce the thickness of the image pickup apparatus, studies are being made on the shape or the method of assembling the lens constituting the lens system, and studies are being made to minimize the thickness of the cover glass for protecting the lens system.

Further, research has been conducted to reduce the thickness of the near-infrared-cut filter of interest in the present invention. In particular, research has been conducted on the commercialization of a 0.1 T glass substrate as an alternative to the resin substrate, which has the above-mentioned disadvantages.

However, the smaller the thickness of the glass substrate, the lower the strength thereof, which is considered the biggest problem. There is another problem in that processing and handling methods thereof are not easy.

Further, the near-infrared reflection layer formed on the glass substrate is generally formed of a multi-layered film including an oxide. In this case, the difference in stress between the glass substrate and the oxide causes a decrease in the strength of the glass substrate, which is a more critical problem in the case of a thin glass plate of 0.3 T or less.

SUMMARY OF THE INVENTION

Accordingly, the present invention has been made keeping in mind the above problems occurring in the related art, and an object of the present invention is to provide an optical-filter-cell-array structure in which an optical filter using a tempered glass substrate is provided as a structure in the form of a cell array so that storage and supply thereof are easy, and a method of manufacturing the same.

In order to accomplish the above object, the technical gist of the present invention is an optical-filter-cell-array structure. The optical-filter-cell-array structure includes an optical filter, which includes an optical filter layer for blocking light of a specific wavelength formed on the upper side or the lower side of a tempered glass substrate and which is provided in the form of a cell array in a sheet state.

Another technical gist of the present invention is a method of manufacturing an optical-filter-cell-array structure. The method includes forming a sheet-cutting part according to the form of a cell array on a mother glass substrate, tempering the mother glass substrate so that the lateral side of the mother glass substrate is tempered through the sheet-cutting part while the upper side and the lower side of the mother glass substrate are tempered, and forming an optical filter layer on the upper side or the lower side of the mother glass substrate.

Further, preferably, the cell array has an interval of 0.1 to 2 mm between cells and includes a plurality of cell units, and the interval between the cell units is 0.5 to 2 mm.

Further, preferably, the tempered glass substrate includes an alumino-silicate glass series and is obtained through chemical tempering, and the chemical tempering is performed using potassium nitrate ($KNO_3$) at a temperature of 350 to 450° C.

Further, preferably, a resin layer for strength reinforcement is further formed on any one or both of the upper side and the lower side of the tempered glass substrate so as to be positioned on the lower side of the optical filter layer, and the resin layer further includes a near-infrared absorption component.

Further, preferably, any one of a near-infrared reflection layer and a visible-ray-low-reflection layer is formed on both the upper side and the lower side of the tempered glass substrate, or a combination of the near-infrared reflection layer and the visible-ray-low-reflection layer is formed on both the upper side and the lower side of the tempered glass substrate, thus forming the optical filter layer.

Preferably, the thickness of the tempered glass substrate is 0.05 to 0.3 mm.

In the present invention, an optical filter is manufactured using a tempered glass substrate, thus providing an optical filter having reinforced strength.

Further, in the present invention, the optical filter is provided in the form of a cell array structure, thus preventing undesirable removal of optical filter cells provided in a sheet state and adjusting the interval between the optical filter cells or the shape of the cell unit according to the product specification, thereby providing an optical-filter-cell-array structure that is easy to store or supply.

Further, in the present invention, a resin layer for strength reinforcement is formed on the tempered glass substrate so that the strength of the glass substrate is further reinforced, thereby further improving the strength of the optical filter using the same.

Further, in the present invention, the entire process is performed in a sheet state, so that the process is simple and it is easy to handle and process a glass substrate, particularly a thin glass plate having a thickness of 0.3 mm or less, thereby improving the overall process yield and reducing processing costs.

In the present invention, particularly, difficulty in handling, processing, and tempering of a conventional thin glass substrate is overcome by forming a sheet-cutting part and thereby maintaining the mother glass substrate in a sheet state to perform the process.

Further, a thin glass substrate of 0.05 T to 0.3 T, that is, 0.3 mm or less, is tempered and then used, and the resin layer for strength reinforcement is used to further improve strength, so that it is possible to provide the optical filter using the thin glass substrate. Accordingly, it is possible to achieve slimming of the optical filter so as to realize slimming of the image pickup apparatus.

Further, the resin layer for strength reinforcement is formed to thus form an optical filter layer, so that the coating property of the optical filter layer is improved and the stress difference between the optical filter layer and the glass substrate is relaxed, thus further improving the strength of the glass substrate and minimizing the warpage of the substrate. Thereby, it is possible to provide a high-quality optical filter, and thus commercialization thereof is expected.

Further, a near-infrared reflection layer or a visible-ray-low-reflection layer based on an optical design is formed as the optical filter layer, so that light in a near-infrared wavelength band is blocked and a visible-ray reflection ratio is minimized, thereby providing a near-infrared-cut filter having excellent performance.

BRIEF DESCRIPTION OF THE DRAWINGS

The above and other objects, features and advantages of the present invention will be more clearly understood from the following detailed description taken in conjunction with the accompanying drawings, in which:

FIG. 2 is a mimetic view showing the cross-section of an optical filter according to the embodiment of the present invention;

FIGS. 3A and 3B are a mimetic view showing the form of an optical-filter-cell array according to the embodiment of the present invention;

DESCRIPTION OF THE PREFERRED EMBODIMENTS

The present invention provides an optical filter using a tempered glass substrate to reinforce the strength thereof. In the case of the optical filter, the glass substrate is tempered and processed while being maintained in a sheet state, and an optical filter layer is formed on the upper side or the lower side of the glass substrate, thus blocking light in a specific wavelength.

In particular, the optical filter according to the present invention is provided in the form of a cell array structure, thus preventing undesirable removal of optical filter cells provided in a sheet state and adjusting the interval between the optical filter cells or the shape of the cell unit according to the product specification, thereby providing an optical-filter-cell-array structure that is easy to store or supply.

Further, in the present invention, a resin layer for strength reinforcement is formed between the glass substrate and the optical filter layer, thus further reinforcing the strength of the optical filter.

That is, a thin glass plate of 0.05 T to 0.3 T, that is, 0.3 mm or less, is tempered and then used, thereby providing an optical filter using a thin glass substrate. The resin layer for strength reinforcement is further formed, thus reinforcing strength and achieving the slimming of the optical filter so as to realize the slimming of the image pickup apparatus.

Further, the resin layer for strength reinforcement and the optical filter are famed, so that the coating property of the optical filter layer is improved and the stress difference between the optical filter layer and the tempered glass substrate is relaxed, thus further improving the strength of the tempered glass substrate and minimizing the warpage of the substrate. Thereby, it is possible to provide a high-quality optical filter.

Further, a near-infrared reflection layer or a visible-ray-low-reflection layer based on an optical design is formed as the optical filter layer, so that light in a near-infrared wavelength band is blocked and a visible-ray reflection ratio is minimized, thereby providing a near-infrared-cut filter having excellent performance.

Figure 1:
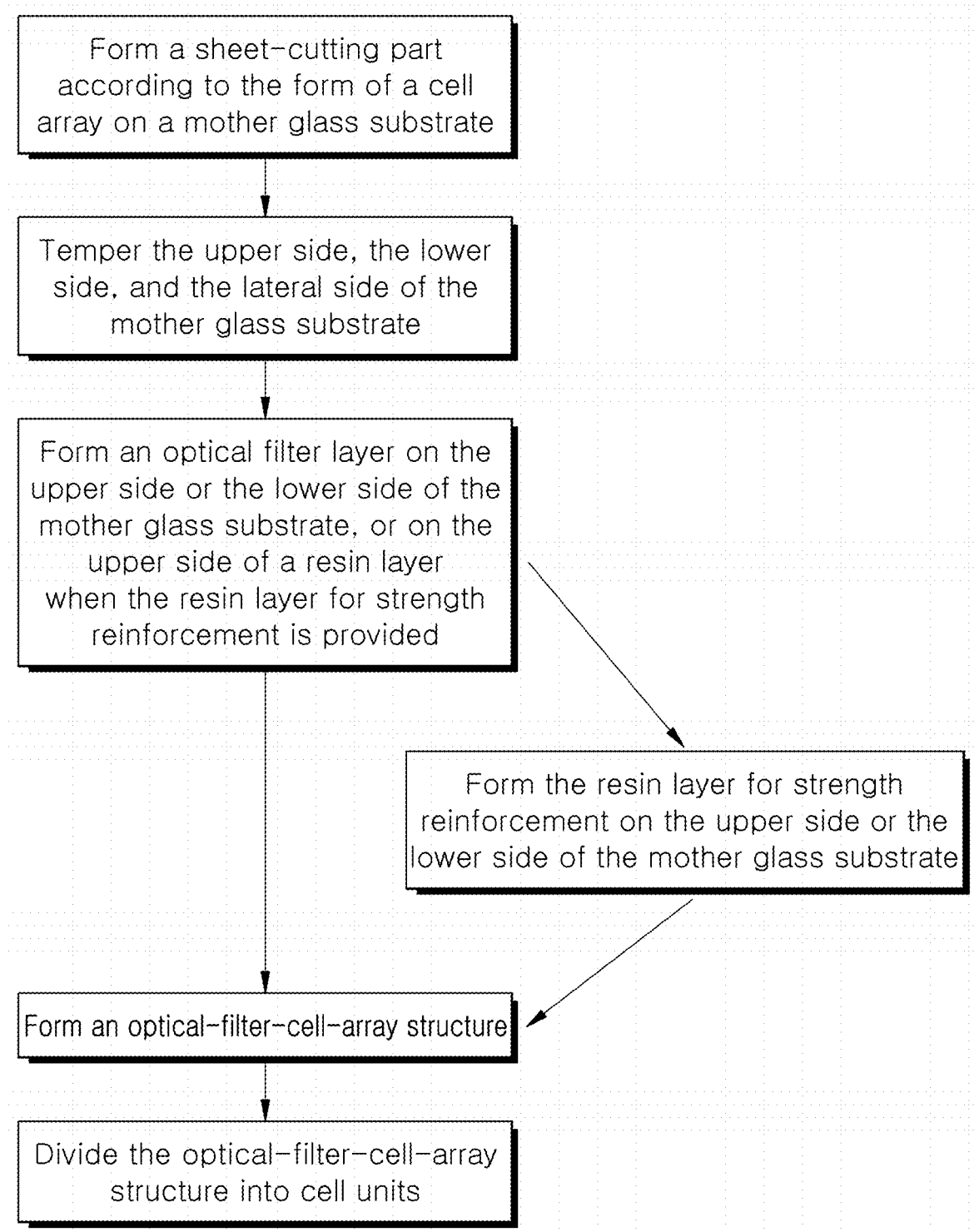
FIG. 1 is a block diagram showing a method of manufacturing an optical filter according to an embodiment of the present invention.
Figure 4:
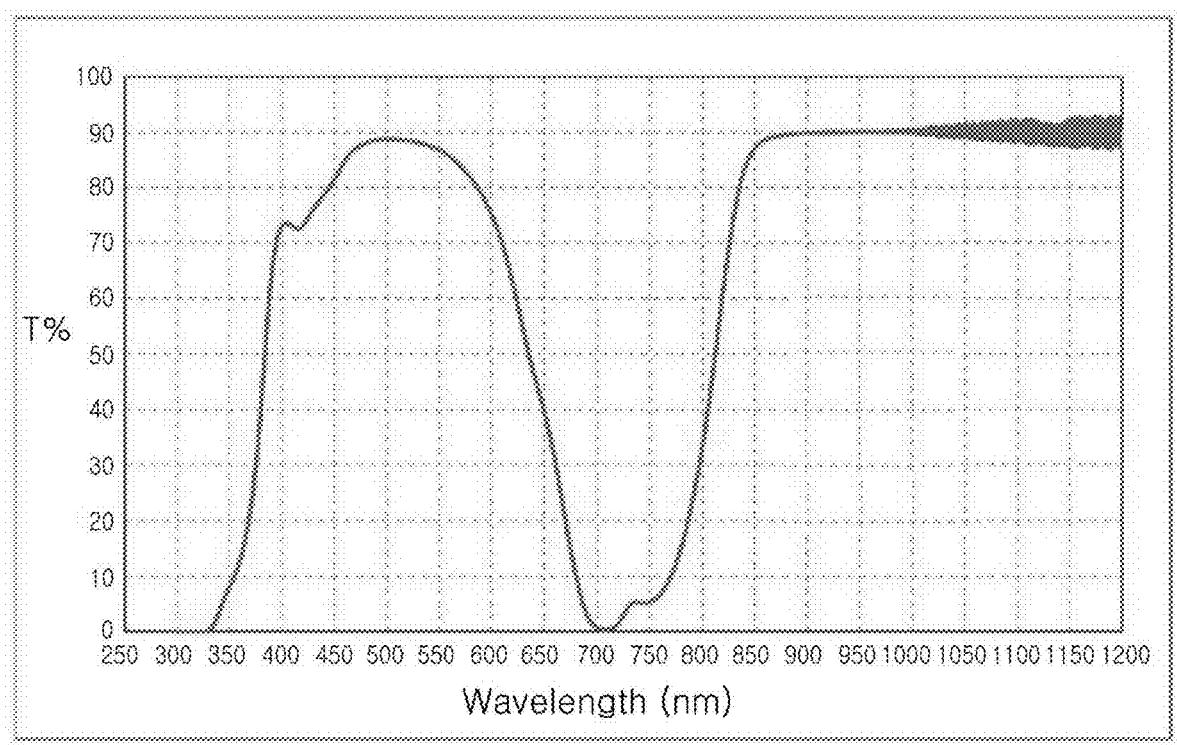
FIG. 4 is a characteristic graph after a resin layer for strength reinforcement is formed according to the embodiment of the present invention.
Figure 5:
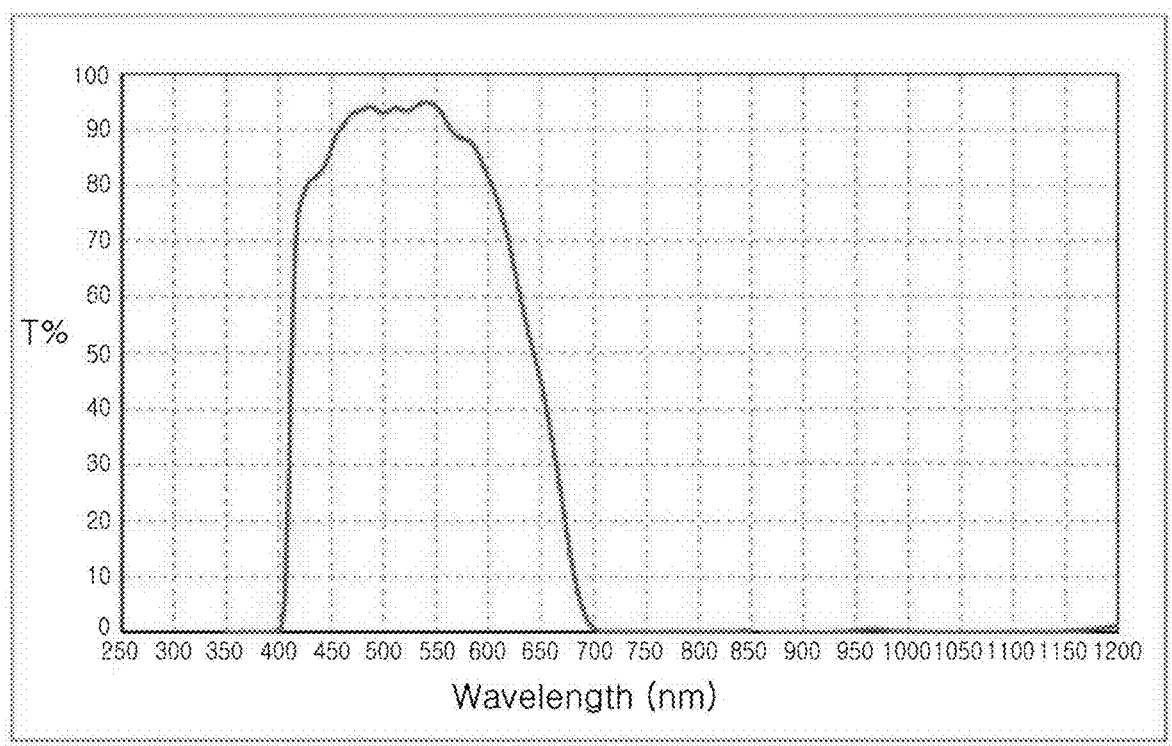
FIG. 5 is a characteristic graph after a near-infrared reflection layer of a near-infrared-cut filter is formed according to the embodiment of the present invention.

Hereinafter, an embodiment of the present invention will be described in detail with reference to the accompanying drawings. FIG. 1 is a block diagram showing the method of manufacturing the optical filter according to the embodiment of the present invention, FIG. 2 is a mimetic view showing the cross-section of the optical filter according to the embodiment of the present invention, FIGS. 3A and 3B are a mimetic view showing the form of the optical-filter-cell array according to the embodiment of the present invention, FIG. 4 is a characteristic graph after the resin layer for strength reinforcement is formed according to the embodiment of the present invention, and FIG. 5 is a characteristic graph after a near-infrared reflection layer of a near-infrared-cut filter is formed according to the embodiment of the present invention.

As shown in the drawings, the method of manufacturing the optical-filter-cell-array structure according to the present invention includes forming a sheet-cutting part according to the form of a cell array on a mother glass substrate 100, tempering the mother glass substrate 100 so that the lateral side of the mother glass substrate is tempered through the sheet-cutting part while the upper side and the lower side of the mother glass substrate 100 are tempered, and forming an optical filter layer 300 on the upper side or the lower side of the mother glass substrate.

Division into cell units is performed in the optical-filter-cell-array structure, thus forming an optical filter 10.

The mother glass substrate or the cell-unit glass substrate according to the present invention may be more effectively applied when the thin glass substrate is used. In particular, the mother glass substrate or cell-unit glass substrate may be applied to a thin glass substrate 100 of 0.05 T to 0.3 T, that is, 0.3 mm or less, so that the strength of the thin glass substrate 100 is reinforced, thereby improving the strength of the optical filter 10 and achieving the slimming thereof.

The reference numeral 100 shown in FIG. 2 may be used in the mother glass substrate or in the cell-unit glass substrate in some cases.

In the method of manufacturing the optical-filter-cell-array structure according to the embodiment of the present invention, a sheet-cutting part according to the form of a cell array is first formed on the mother glass substrate 100.

The mother glass substrate 100 includes an aluminosilicate glass series, and is subjected to chemical tempering before use.

The sheet-cutting part is formed by sheet cutting the mother glass substrate 100 using a laser. Cracks are formed through the region of the mother glass substrate 100 from the upper side to the lower side thereof using the laser without forming breaking lines.

With respect to this, portions of the mother glass substrate 100 including the cracks on both sides of the sheet-cutting part are engaged with each other in the form of a zigzag or are interlinked in a manner such as screw engagement. Accordingly, the portions of the mother glass substrate 100 on both sides of the sheet-cutting part are held in mutual engagement, thus maintaining the mother glass substrate in a sheet state.

That is, although the sheet-cutting part including the cracks formed through the mother glass substrate 100 from the upper side to the lower side thereof is formed, the mother glass substrate is not divided into cell units but is maintained in a sheet state. This is referred to as "sheet cutting" in the present invention.

The cell array is formed in various arrangements according to the product specification or the supply form. Unit cells may be formed so as to be spaced apart from each other at predetermined intervals, may be formed without any interval therebetween, or may be provided in the form of a cell unit in which a set of unit cells that are spaced apart from each other at predetermined intervals forms a single unit. The cell units are formed so as to be spaced apart from each other at predetermined intervals, and the sheet-cutting part is formed so as to correspond to the cell array structure.

This is to prevent the unit cells from being undesirably removed while making it easy to store, supply, and handle the structure.

In FIG. 3A, the unit cells are provided in the form of a 3×3 array, and the unit cell arrays are assembled into cell units and arranged in an array form. In FIG. 3B, the unit cells are provided in the form of a 1×3 array, and the unit cell arrays are assembled into cell units and arranged in the array form.

Further, the optical filter unit cells constituting the cell unit are arranged without any interval therebetween, or are arranged so as to be spaced apart from each other at a predetermined interval according to the product specification or the supply form.

This allows the optical filter supplied in the state of the mother glass substrate 100, that is, in a sheet state, to form an array structure, and the optical filter is formed so as to have various cell array structures according to the product specification or the supply form. The distance between the unit cells is preferably 0.1 to 2 mm, and the interval between the cell units is preferably 0.5 to 2 mm. In the case of ranges that are wider than the above-described ranges, material may be wasted, and in the case of ranges that are narrower than the above-described ranges, the unit cells or the cell units may be undesirably removed according to the product specification.

In addition, when the mother glass substrate 100 is tempered, the lateral side of the mother glass substrate 100 is tempered through the sheet-cutting part.

That is, the sheet-cutting part becomes the lateral side of the cell-unit glass substrate 100 when the mother glass substrate 100 is cut by the cell unit. Therefore, a tempered layer is formed to a thickness of about 20 to 90 µm on the upper side and the lower side of the mother glass substrate 100 and also on the lateral side thereof through the sheet-cutting part due to tempering.

The mother glass substrate 100 includes an aluminosilicate glass series.

In the case of the process of tempering the mother glass substrate 100, chemical tempering is performed using potassium nitrate ($KNO_3$) at a temperature of 350 to 450° C. After the tempering, slow cooling is performed to prevent the formation of cracks. When the tempering is completed, the mother glass substrate 100 is cleaned.

That is, the mother glass substrate 100 is tempered while being maintained in a sheet state. In this case, not only the upper side and the lower side of the mother glass substrate 100 but also the lateral side, i.e., the cut side, of the cell-unit glass substrate 100 of the mother glass substrate 100 are tempered.

This tempering process is performed while the mother glass substrate 100 is maintained in a sheet state, so that a sheet process is feasible, thereby improving mass productivity and durability compared to a conventional cell type process.

In particular, when a conventional cell unit process is used, it is very difficult to perform the operation of tempering the thin glass substrate, and it is very difficult to put the thin glass substrate into practical use due to the limited strength thereof.

However, the present invention provides a glass substrate 100 including a thin plate having reinforced strength by forming the sheet-cutting part so that the thin glass plate is subjected to a tempering process in a sheet state, thus enabling very easy handling and processing of the thin glass substrate 100 and also enabling tempering of the lateral side of the glass substrate.

That is, in a conventional sheet process, the lateral side, which is the cut side of the mother glass substrate 100, is not tempered, and thus the lateral strength thereof is low. However, since the lateral side is tempered while maintaining the sheet state in the present invention, the strength as well as the yield may be improved.

In addition, a resin layer 200 for strength reinforcement is famed on the upper side or the lower side of the mother glass substrate 100. The resin layer 200 for strength reinforcement is famed on the entire surface of any one or both of the upper side and the lower side of the mother glass substrate 100. The formation is performed while the sheet state is maintained, thus improving the process yield.

FIG. 2 shows the case in which the resin layer 200 for strength reinforcement is formed on the upper side of the mother glass substrate 100, the optical filter layer 300 is formed on the resin layer, and only the optical filter layer 300 is formed on the lower side of the mother glass substrate according to the embodiment of the present invention. This indicates an optical filter unit cell. In FIG. 2, the glass substrate 100 may be a tempered mother glass substrate or a tempered cell-unit glass substrate, which is shown without distinction therebetween.

The optical filter unit cells are arranged in the form of a cell array as shown in FIGS. 3A and 3B, and various cell array structures are provided according to the product specification or the supply form, as described above.

The resin layer 200 for strength reinforcement is applied on the mother glass substrate 100 to improve the strength of the mother glass substrate 100 and to minimize the stress difference between the optical filter layer 300 and the glass substrate 100, thereby minimizing the strength reduction of the mother glass substrate 100 and the warpage of the mother glass substrate.

That is, stress is generated due to the difference in thermal expansion coefficient at a combination surface of the oxide multi-layered film (e.g., $SiO_2$, $TiO_2$, and $Ta_2O_5$) used as the optical filter layer 300 with the glass substrate 100. Accordingly, the compressive stress balance of the glass substrate 100 is broken due to external impact, causing the strength reduction or the warpage of the glass substrate. Therefore, the resin layer 200 for strength reinforcement is formed between the glass substrate 100 and the optical filter layer 300, thereby preventing direct bonding between the glass substrate 100 and the optical filter layer 300, which is a cause of the strength reduction or the warpage.

The resin layer 200 for strength reinforcement is preferably formed to a thickness of 0.1 to 20 μm using a transparent material so as not to affect the visible ray transmittance. It is most preferable that the optimum thickness is about 0.5 to 5 μm in order to secure almost no decrease in transmittance, a strength supplementation characteristic, and slimming.

Meanwhile, the resin layer 200 for strength reinforcement may further include a near-infrared absorption component so that near-infrared rays are blocked more effectively.

The near-infrared absorption component may include a pigment that absorbs near-infrared rays, for example, a squarylium-based pigment, a phthalocyanine-based pigment, or a cyanine-based pigment, so that absorption of visible rays is minimized and absorption of near-infrared rays is maximized to thus provide a near-infrared-cut filter having high performance.

As the material of the resin layer 200 for strength reinforcement, a transparent material having excellent coat-forming and coating properties is used, and any one of polycarbonate, an epoxy-based resin, a urethane-based resin, an acryl-based resin, acrylate, a silane-based resin, and a fluorine-based resin is used. The near-infrared absorption component is mixed with the material of the resin layer 200 if necessary. The near-infrared absorption component may be adjusted depending on the specification of the near-infrared-cut filter, and does not interfere with the transmission of visible rays.

The resin layer 200 may be provided using various methods for applying the material of the resin layer on the glass substrate 100, such as dipping, spin coating, die coating, bar coating, spraying, screen printing, inkjet printing, dispensing, and imprinting.

Meanwhile, the formation of the resin layer 200 for strength reinforcement may be selectively employed after the tempering of the mother glass substrate 100, and a process for forming the optical filter layer 300 on the lower side may be performed immediately after the tempering of the mother glass substrate 100.

The optical filter layer 300 is formed on the upper side and the lower side of the mother glass substrate 100, and the optical filter layer 300 is formed on the upper side of the resin layer when the resin layer 200 for strength reinforcement is provided.

That is, when the resin layer 200 for strength reinforcement is formed, the optical filter layer 300 is famed on the upper side of the resin layer so that the glass substrate 100 and the optical filter layer 300 are not directly bonded to each other. When the resin layer 200 for strength reinforcement is formed on only any one of the upper side and the lower side of the mother glass substrate 100 according to necessity, one side of the optical filter layer 300 is positioned directly on the mother glass substrate 100, and the other side thereof is positioned on the upper side of the resin layer 200 for strength reinforcement.

The optical filter layer 300 is for selectively reflecting or transmitting a specific wavelength band. In the embodiment of the present invention, the optical filter layer may be formed of a near-infrared reflection layer or a visible-ray-low-reflection layer, thus being available in the near-infrared-cut filter.

The optical filter layer 300 is famed mainly by depositing an oxide multi-layered film (e.g., $SiO_2$, $TiO_2$, and $Ta_2O_5$). In order to minimize the dependence of the incident angle according to the optical design depending on the purpose or use and to transmit or reflect a wavelength in a specific region, the oxide multi-layered film having a specific thickness and high and low refractive indices is selectively deposited to thus form the optical filter layer.

That is, any one of the near-infrared reflection layer and the visible-ray-low-reflection layer may be famed on both the upper side and the lower side of the tempered glass substrate, or a combination of the near-infrared reflection layer and the visible-ray-low-reflection layer may be famed on both the upper side and the lower side of the tempered glass substrate according to the optical design depending on the purpose or use.

For example, any one of a near-infrared-reflection multilayer and a visible-ray-low-reflection multilayer may be formed on the upper side and the lower side of the tempered glass substrate, or the near-infrared-reflection multilayer may be formed on the upper side and the visible-ray-low-reflection multilayer may be famed on the lower side (or vice versa). Alternatively, a combination of the near-infrared-reflection multilayer and the visible-ray-low-reflection multilayer may be provided on both the upper side and the lower side.

The optical filter layer 300 may be provided using publicly known physical and chemical deposition methods, for example, E-beam, sputtering, or CVD processes.

In addition, when the formation of the optical filter layer 300 is completed, the mother glass substrate 100 is divided into cell units, thereby completing a cell-unit optical filter 10.

That is, when the entire process is completed while the mother glass substrate 100 is maintained in a sheet state, the mother glass substrate 100 is divided into the cell-unit glass substrates 100.

To be specific, a breaking line is formed using a laser, or a predetermined pressure is applied to thus perform cutting by the cell units, so that the cell-unit glass substrate 100, that is, the cell-unit optical filter 10, is formed.

The predetermined pressure required for the division into the cell units may be obtained using any method that is capable of directly applying a certain pressure or impact to each cell formed on the mother glass substrate 100 through shape processing.

FIG. 4 shows a characteristic graph after a resin layer (in which a squarylium-based dye is added to urethane and acrylic synthetic resins) is formed on one side (the upper side in the drawing) of the tempered glass substrate (thickness of 0.1 mm). It could be confirmed that excellent absorption performance was observed in a near-infrared region.

FIG. 5 shows a characteristic graph of a near-infrared-cut filter (angle of incidence of 0°) in which a resin layer is formed on the upper side (front side) of a glass substrate and optical filter layers are then formed on the upper side (front side) and the lower side (rear side) (twenty four near-infrared reflection layers (front side)/glass substrate/eighteen visible-ray-low-reflection layers (rear side) obtained using $SiO_2$ or $TiO_2$) according to the embodiment of the present invention. It could be confirmed that excellent near-infrared reflection and absorption performances of 90% or more were observed (the front side refers to the side of the glass substrate on which light is incident, and the rear side refers to the opposite side thereof).

Table 1 below shows measurement of the strength of the tempered glass substrate on which the resin layer for strength reinforcement was famed according to the present invention. In the measurement method, a specimen is placed on a bottom jig (6.42×6.42 mm) and then pressed using the press-in part of a top jig (2 mm in diameter, 1 R), thus measuring the breaking strength (the speed of the press-in part of 50 mm/min).

For comparison, the strength of a tempered glass substrate (alumino-silicate glass) specimen (B/G, bare glass) having a 0.1 T (0.1 mm) thickness manufactured according to the embodiment of the present invention was measured.

In the case of the specimen including the resin layer formed thereon, the strength was measured for the case where the resin layer was formed on the lower side (bottom) of the tempered glass substrate and for the case where the resin layer was famed on the upper side (top) of the tempered glass substrate.

TABLE 1

| Specimen | B/G (tempered glass substrate) | Tempered glass substrate coated with rein layer | |
|---|---|---|---|
| | | Bottom | Top |
| 1 | 8.87 | 9.22 | 7.83 |
| 2 | 9.30 | 9.54 | 8.99 |
| 3 | 9.35 | 8.97 | 8.80 |
| 4 | 7.71 | 8.79 | 8.53 |
| 5 | 7.73 | 8.04 | 8.86 |
| 6 | 6.95 | 8.90 | |
| 7 | 9.49 | 9.01 | |
| 8 | 8.92 | 8.92 | |
| 9 | 9.01 | 8.45 | |
| 10 | 7.88 | 9.09 | |
| Max | 9.49 | 9.54 | 8.99 |
| Min | 6.95 | 8.04 | 7.83 |
| AVG | 8.52 | 8.89 | 8.60 |
| STDEV (standard error) | 0.88 | 0.41 | 0.46 |
| B10 | 7.50 | 8.35 | 8.17 |

(Unit kgf)

As shown in Table 1, it was confirmed that the strength was higher in the tempered glass substrate on which the resin W layer was famed than in the tempered glass substrate on which the resin layer was not formed. As the result of measurement, both the tempered glass substrate on which the resin layer was not formed and the tempered glass substrate on which the resin layer was famed had higher strength than B10 (the expected strength when the defect rate was 10%).

Generally, it is known that a 0.1 T glass substrate which is not tempered has the strength of 1 to 2 kgf and a resin substrate has the strength of about 1 kgf. Accordingly, it could be confirmed that the strength of the glass substrate tempered according to the present invention was improved and that the strength of the tempered glass substrate on which the resin layer was formed was further improved.

As described above, the present invention provides an optical filter having reinforced strength using a glass substrate, particularly a tempered glass substrate, according to a simple manufacturing method in which tempering and processing are performed while maintaining the glass substrate in a sheet state and in which a resin layer for strength reinforcement is formed on the upper side or the lower side of the glass substrate, if necessary.

In particular, the optical filter according to the present invention is provided in the form of a cell array structure, thus preventing undesirable removal of optical filter cells provided in a sheet state and adjusting the interval between the optical filter cells or the shape of the cell unit according to the product specification, thereby providing an optical-filter-cell-array structure that is easy to store or supply.

Further, in the present invention, the entire process is performed in a sheet state, so that the process is very simple and it is easy to handle and process the glass substrate, thereby improving the overall process yield and reducing processing costs. In the present invention, particularly, difficulty in handling, processing, and tempering of a conventional thin glass substrate is overcome by forming a sheet-cutting part and thereby maintaining the mother glass substrate in a sheet state to perform the process.

Further, a thin glass substrate of 0.05 T to 0.3 T, that is, 0.3 mm or less, is tempered to improve strength, and the resin layer for strength reinforcement is formed to further reinforce the strength of the thin glass substrate, so that it is possible to provide the optical filter using the thin glass substrate having the reinforced strength. Accordingly, it is possible to achieve slimming of the optical filter so as to realize slimming of the image pickup apparatus having the reinforced strength.

Further, the resin layer for strength reinforcement is formed to thus form an optical filter layer, so that the coating property of the optical filter layer is improved and the stress difference between the optical filter layer and the glass substrate is relaxed, thus further improving the strength of the glass substrate and minimizing warpage of the substrate. Thereby, it is possible to provide a high-quality optical filter, contributing to commercialization of the optical filter using the thin glass substrate.

Further, a near-infrared reflection layer or a visible-ray-low-reflection layer based on an optical design is formed as the optical filter layer, so that light in a near-infrared wavelength band is blocked and a visible-ray reflection ratio is minimized, thereby providing a near-infrared-cut filter having excellent performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical-filter-cell-array structure comprising:
    an optical filter which includes an optical filter layer for blocking light of a specific wavelength formed on an upper side or a lower side of a tempered glass substrate and which is provided in a form of a cell array in a sheet state,
    wherein the optical filter layer is transparent to light of other wavelengths, a thickness of the tempered glass substrate is 0.05 to 0.3 mm, a resin layer for strength reinforcement is further formed on any one or both of the upper side and the lower side of the tempered glass substrate so as to be between the tempered glass substrate and the optical filter layer, the resin layer is transparent to the light of the other wavelengths, the resin layer is positioned relative to the optical filter layer such that the light of the other wavelengths that passes through the optical filter layer in a direction normal to the cell array in the sheet state also passes through the resin layer, and the resin layer is formed so as to be 0.1 to 20 μm in thickness.

2. The optical-filter-cell-array structure of claim 1, wherein the cell array has an interval of 0.1 to 2 mm between cells.

3. The optical-filter-cell-array structure of claim 1, wherein the cell array includes a plurality of cell units.

4. The optical-filter-cell-array structure of claim 3, wherein an interval between the cell units is 0.5 to 2 mm.

5. The optical-filter-cell-array structure of claim 1, wherein the tempered glass substrate includes an alumino-silicate glass series and is obtained through chemical tempering.

6. The optical-filter-cell-array structure of claim 5, wherein the chemical tempering is performed using potassium nitrate ($KNO_3$) at a temperature of 350 to 450° C.

7. The optical-filter-cell-array structure of claim 1, wherein the resin layer further includes a near-infrared absorption component.

8. The optical-filter-cell-array structure of claim 1, wherein any one of a near-infrared reflection layer and a visible-ray-low-reflection layer is formed on both the upper side and the lower side of the tempered glass substrate, or a combination of the near-infrared reflection layer and the visible-ray-low-reflection layer is formed on both the upper side and the lower side of the tempered glass substrate, thus forming the optical filter layer.

9. A method of manufacturing an optical-filter-cell-array structure, the method comprising:
    forming a sheet-cutting part according to a form of a cell array on a mother glass substrate having a thickness of 0.05 to 0.3 mm;
    tempering the mother glass substrate so that a lateral side of the mother glass substrate is tempered through the sheet-cutting part while an upper side and a lower side of the mother glass substrate are tempered; and
    forming an optical filter layer on the upper side or the lower side of the mother glass substrate,
    wherein, after the mother glass substrate is tempered, a resin layer for strength reinforcement is formed on any one or both of the upper side and the lower side of the mother glass substrate so as to be between the mother glass substrate and the optical filter layer, and the resin layer is formed so as to be 0.1 to 20 μm in thickness.

10. The method of claim 9, wherein the cell array has an interval of 0.1 to 2 mm between cells.

11. The method of claim 9, wherein the cell array includes a plurality of cell units.

12. The method of claim 11, wherein an interval between the cell units is 0.5 to 2 mm.

13. The method of claim 9, wherein an alumino-silicate glass series is used as the mother glass substrate.

14. The method of claim 13, wherein tempering of the mother glass substrate is performed using chemical tempering, and the chemical tempering is performed using potassium nitrate ($KNO_3$) at a temperature of 350 to 450° C.

15. The method of claim 9, wherein the sheet-cutting part is formed by sheet cutting the mother glass substrate using a laser.

16. The method of claim 9, wherein the resin layer further includes a near-infrared absorption component.

17. The method of claim 9, wherein the optical filter layer is formed of any one of a near-infrared reflection layer and a visible-ray-low-reflection layer or a combination of the near-infrared reflection layer and the visible-ray-low-reflection layer.

18. The method of claim 9, wherein:
    the optical filter layer is transparent to light of other wavelengths;
    the resin layer is transparent to the light of the other wavelengths; and
    the resin layer is positioned relative to the optical filter layer such that the light of the other wavelengths that passes through the optical filter layer in a direction normal to the cell array in the sheet state also passes through the resin layer.

* * * * *